United States Patent
Hwang et al.

(10) Patent No.: US 7,958,389 B2
(45) Date of Patent: Jun. 7, 2011

(54) RECORDING/REPRODUCING APPARATUS FOR PERFORMING RMW FOR LOW, RECORDING/REPRODUCING METHOD THEREFOR, AND INFORMATION STORAGE MEDIUM THEREFOR

(75) Inventors: Sung-hee Hwang, Seoul (KR); Jung-wan Ko, Suwon-si (KR); Kyung-geun Lee, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 12/642,504

(22) Filed: Dec. 18, 2009

(65) Prior Publication Data

US 2010/0100694 A1    Apr. 22, 2010

Related U.S. Application Data

(63) Continuation of application No. 11/256,922, filed on Oct. 25, 2005, now Pat. No. 7,681,070.

(30) Foreign Application Priority Data

Dec. 15, 2004    (KR) ............................... 2004-106573

(51) Int. Cl.
*G06F 11/00* (2006.01)
(52) U.S. Cl. ............. 714/6; 714/8; 711/159; 396/47.14; 396/53.15; 396/53.17
(58) Field of Classification Search .................. 714/6, 8; 711/159; 369/47.14, 53.15, 53.17
See application file for complete search history.

(56) References Cited

U.S. PATENT DOCUMENTS

| | | |
|---|---|---|
| 4,953,122 A | 8/1990 | Williams |
| 5,448,728 A | 9/1995 | Takano et al. |
| 6,999,390 B2 | 2/2006 | Lee et al. |
| 7,027,373 B2 | 4/2006 | Ueda et al. |
| 7,272,086 B2 | 9/2007 | Hwang et al. |
| 7,681,070 B2 * | 3/2010 | Hwang et al. ............ 714/6 |
| 2002/0133485 A1 | 9/2002 | Furuhashi |
| 2004/0165495 A1 | 8/2004 | Park et al. |
| 2004/0174785 A1 | 9/2004 | Ueda et al. |
| 2004/0223440 A1 | 11/2004 | Park |
| 2005/0083814 A1 | 4/2005 | Yoshida et al. |

(Continued)

FOREIGN PATENT DOCUMENTS

EP    0 325 823 A1    8/1989

(Continued)

OTHER PUBLICATIONS

International Search Report and Written Opinion of the International Searching Authority issued on Jan. 31, 2006, in counterpart International Application No. PCT/KR2005/004245 (6 pages).

(Continued)

*Primary Examiner* — Philip Guyton
(74) *Attorney, Agent, or Firm* — North Star Intellectual Property Law, PC

(57) ABSTRACT

Replacement data for updating data recorded on an information storage medium is recorded in an area for logical overwrite (LOW) replacement; replacement data for replacing a defect generated on the medium is recorded in an area for defect replacement; and, if a defect is generated in an original block recorded in a predetermined area of the medium during a read-modify-write (RMW) process for a LOW for at least partial data of an original block, a replacement block replacing the original block is recorded in the area for LOW replacement and a defect list (DFL) entry including location information of the original block and location information of the replacement block is generated to indicate the replacement state.

13 Claims, 10 Drawing Sheets

U.S. PATENT DOCUMENTS

2005/0195710 A1 9/2005 Koda et al.
2006/0034411 A1 2/2006 Park

FOREIGN PATENT DOCUMENTS

| JP | 2005-196903 | 7/2005 |
| TW | 573296 B | 1/2004 |
| WO | WO 2004/053874 A1 | 6/2004 |
| WO | WO 2005/089077 A2 | 9/2005 |

OTHER PUBLICATIONS

Taiwanese Office Action issued on Sep. 8, 2009, in counterpart Taiwanese Application No. 094139222 (19 pages, in Chinese, with complete English translation).

Japanese Office Action issued on Nov. 9, 2010, in corresponding Japanese Patent Application No. 2007-546557 (2 pages).

* cited by examiner

RECORDING/REPRODUCING APPARATUS FOR PERFORMING RMW FOR LOW, RECORDING/REPRODUCING METHOD THEREFOR, AND INFORMATION STORAGE MEDIUM THEREFOR

CROSS-REFERENCE TO RELATED APPLICATIONS

This application is a continuation application of and claims the benefit under 35 U.S.C. §120 of a U.S. patent application Ser. No. 11/256,922 filed in the U.S. Patent and Trademark Office on Oct. 25, 2005 now U.S. Pat. No. 7,681,070, which claims the benefit under 35 U.S.C. §119(a) of a Korean Patent application No. 2004-106573, filed on Dec. 15, 2004, in the Korean Intellectual Property Office, the entire disclosure and content of which are incorporated herein by reference for all purposes.

BACKGROUND OF THE INVENTION

1. Field of the Invention

An Aspect of the present invention relates to a disk, and more particularly, to a recording/reproducing apparatus for efficiently managing a read-modify-write (RMW) process for a logical overwrite (LOW), a recording/reproducing method therefore, and an information storage medium therefor.

2. Description of the Related Art

A spare area is generally prepared in a portion of a data area in a rewritable information storage medium. If a defect is detected while user data is being recorded in a user data area (an area obtained by excluding the spare area from the data area) or while data recorded in the user data area is being reproduced, replacement data for replacing the defect data is recorded in the spare area.

For write-once information storage media, the above defect management method is used in a logical overwrite (LOW). LOW is a method by which write-once information storage media are useable similarly with the rewritable information storage media. That is, to update data previously recorded in the user data area, data for replacing the recorded data is recorded in the spare area by treating the recorded data as defect data. This makes data management easy since a host accesses data using a logical address thereof and the data for replacing the recorded data in the user data area appears to be overwritten at the same location by using the fixed logical address of the data recorded in the user data area and assigning a physical address corresponding to the fixed logical address to the data recorded in the spare area.

To maximize utilization of the disk capacity, a method of updating data by LOW during defect management in a unrecorded area of a user data area on a disk or a spare area and generating replacement information for the updated data (replacement entry information) has been suggested to maximize the use of the disk.

Data updating by replacement by LOW and replacement by defect will now be schematically described with reference to FIGS. 1A and 1B.

FIG. 1A illustrates LOW replacement according to the prior art. Referring to FIG. 1A, when data blocks A1, A2, and A3 have been recorded at physical locations P1, P2, and P3 on a recording medium, respectively, if a host commands a drive system to record data blocks B1, B2, and B3 at the original locations P1, P2, and P3 to update the data blocks A1, A2, and A3 to the data blocks B1, B2, and B3 by LOW, the drive system records the data blocks B1, B2, and B3 at physical locations P4, P5, and P6 in a user data area on the medium and generates a defect list (DFL) entry indicating that the original locations P1, P2, and P3 were replaced with the replacement locations P4, P5, and P6.

Thereafter, if the host commands the drive system to reproduce the data blocks B1, B2, and B3 from logical addresses corresponding to the original locations, the drive system reproduces the data blocks B1, B2, and B3 recorded at the replacement locations P4, P5, and P6 by referring to the DFL entry and transmits the reproduced data blocks B1, B2, and B3 to the host. When the drive system cannot reproduce the data blocks B1, B2, and B3 recorded at the replacement locations P4, P5, and P6, it cannot be guaranteed for the data recorded at the replacement locations to be the same as the data recorded at the original locations since the replacement locations P4, P5, and P6 are located in the user data area. So, the drive system continuously retries to reproduce the data blocks B1, B2, and B3 recorded at the replacement locations P4, P5, and P6, and if the drive system fails to reproduce the data blocks B1, B2, and B3, the drive system informs the host that the data blocks B1, B2, and B3 cannot be reproduced.

FIG. 1B illustrates defect replacement according to the prior art. Referring to FIG. 1B, when a host commands a drive system to record data blocks A1, A2, and A3 at logical addresses corresponding to original locations P1, P2, and P3 on a medium, respectively, the drive system detects a defect at the physical location P2 while recording the data blocks A1, A2, and A3 at the physical locations P1, P2, and P3, records the data block A2 at a replacement location P5 in a spare area by replacing the original location P2 with the replacement location P5, and generates a DFL entry indicating that the original location P2 was replaced with the replacement location P5.

Thereafter, if the host commands the drive system to reproduce the data block A2 at the logical address corresponding to the original location P2, the drive system reproduces the data block A2 recorded at the replacement location P5 by referring to the DFL entry and transmits the reproduced data block A2 to the host. If the drive system cannot reproduce the data block A2 recorded at the replacement location P5 due to a defect, the drive system regards the data block A2 recorded at the original location P2 as being the same as the data block A2 recorded at the replacement location P5 since P5 is the replacement location in the spare area. Accordingly, even if the drive system cannot reproduce the data block A2 recorded at the replacement location P5, the drive system tries to reproduce the data block A2 recorded at the original location P2. If the data block A2 recorded at the original location P2 is error-correctable, the drive system can transmit the error-corrected data block A2 to the host.

To maximize utilization of disk capacity and manage disks by discriminating between LOW replacement and defect replacement, methods of using disks by discriminating between an area for replacement by LOW and an area for replacement by defect have been developed. In one of them, an area for replacement by defect is limited to a spare area allocated for conventional replacement by defect and an area for replacement by LOW is limited to a user data area of a data area or a specific area of the user data area except the spare area. Thus, whether data at a replacement location has been recorded by replacement by LOW or replacement by defect can be determined by confirming an area in which the replacement location of a DFL entry (also called a replacement entry, a defect entry, or a defect/replacement entry) exists.

For write-once information storage media, user data of a replacement block after replacement by defect is the same as user data of an original block before the replacement by defect. However, since the replacement by LOW is mainly used to update data, it cannot be guaranteed that user data of a replacement block be the same as user data of an original block before the replacement by LOW. If a replacement block indicated by a DFL entry is located in a spare area, it can be perceived that the DFL entry has been generated due to a defect. Accordingly, user data of an original block can be regarded as being the same as user data of the replacement block. Thus, if the replacement block cannot be error-corrected due to a defect when it is reproduced, the user data can be obtained by reproducing the original block indicated by the DFL entry. In more detail, even if the original block cannot be error-corrected since the original block has been replaced due to the defect, the original block may be sometimes error-corrected by cleaning the dust from a recording surface of a medium.

In this case, the replacement by defect and the replacement by LOW are discriminated from each other to determine whether user data of a replacement block is the same as user data of an original block by recognizing areas in which replacement blocks of the DFL entry for the two replacements are recorded.

In the case of conventional write-once information storage media and apparatuses not using LOW, when data is recorded, a recording timing is limited to a start location of each recording/reproducing unit. Because write-once information storage media cannot be overwritten, a host manages data sector by sector (2048 bytes), and an information recording apparatus records data block by block, each block consisting of a plurality of sectors.

However, when LOW is applied to write-once information storage media, the recording timing does not have to be limited to a recording/reproducing unit, and it is possible to record data in sector units managed by the host. Due to this, a read-modify-write (RMW) process is necessary for the write-once information storage media and apparatuses to update a portion of one block data. However, when data is logically overwritten in partial sectors of a previously recorded block, a drive system reads the block including the partial sectors, modifies the partial sectors of the block, and writes the modified block in a unrecorded area of the medium by replacing the read block with the modified block. On the other hand, when a previously recorded block is reproduced, if the block cannot be reproduced, i.e., if an ECC error is generated, since the block is conceptually a defect block, replacement by defect should be performed. In this state, since an area for replacement by defect and an area for replacement by LOW are discriminated from each other, a replacement block for replacing a block to which replacement by LOW and replacement by defect are simultaneously applied is recorded becomes a problem.

SUMMARY OF THE INVENTION

An aspect of the present invention provides a recording/reproducing apparatus for efficiently managing a read-modify-write (RMW) process for a logical overwrite (LOW) in a system in which a replacement area for LOW replacement is discriminated from a replacement area for defect replacement, a recording/reproducing method therefore, and an information storage medium therefor.

According to an aspect of the present invention, there is provided an information storage medium comprising: an area for replacing data recorded on the medium by logical overwrite (LOW) in order to update the data; and an area for replacing defects occurring on the medium, wherein if a defect occurs in an original block recorded in a predetermined area of the medium during a read-modify-write (RMW) process for a replacement by LOW for at least partial data of the original block, a replacement block replacing the original block is recorded in the area for replacement by LOW, and a defect list (DFL) entry indicating the replacement state includes location information of the original block and location information of the replacement block.

The replacement block may be a recording or reproducing unit block, which includes a data portion containing user data and an additional information portion containing the location information of the original block.

The data portion may include a valid data portion, which is overwritten, and an invalid data portion in which padding data is recorded.

The additional information portion may further include state information indicating that the valid data portion and the invalid data portion are included in the data portion. The state information may indicate whether data is valid sector by sector.

The additional information portion may be recorded to have better error correction capability than the user data portion.

The location information of the original block and the location information of the replacement block may be represented by addresses on a physical space of the medium.

According to another aspect of the present invention, there is provided a recording/reproducing apparatus comprising: a write/read unit recording data on an information storage medium or reading data from the medium; and a controller controlling the write/read unit to record replacement data for updating data recorded on the medium in an area for replacement by logical overwrite (LOW), record replacement data for replacing a defect occurring on the medium in an area for replacement by defect, and record, if a defect occurs in an original block recorded in a predetermined area of the medium during a read-modify-write (RMW) process for a replacement by LOW for at least partial data of the original block, a replacement block replacing the original block in the area for replacement by LOW, and generating a defect list (DFL) entry including location information of the original block and location information of the replacement block in order to indicate the replacement state.

According to another aspect of the present invention, there is provided a recording/reproducing method comprising: recording replacement data for updating data recorded on the medium in an area for replacement by logical overwrite (LOW) and recording replacement data for replacing a defect occurring on the medium in an area for replacement by defect; if a defect occurs in an original block recorded in a predetermined area of the medium during a read-modify-write (RMW) process for a replacement by LOW for at least partial data of the original block, recording a replacement block replacing the original block in the area for replacement by LOW; and generating a defect list (DFL) entry including location information of the original block and location information of the replacement block.

BRIEF DESCRIPTION OF THE DRAWINGS

The above and/or other features and advantages of the present invention will become more apparent by describing in detail embodiments thereof with reference to the attached drawings in which.

DETAILED DESCRIPTION OF THE EMBODIMENTS

Figure 1A:
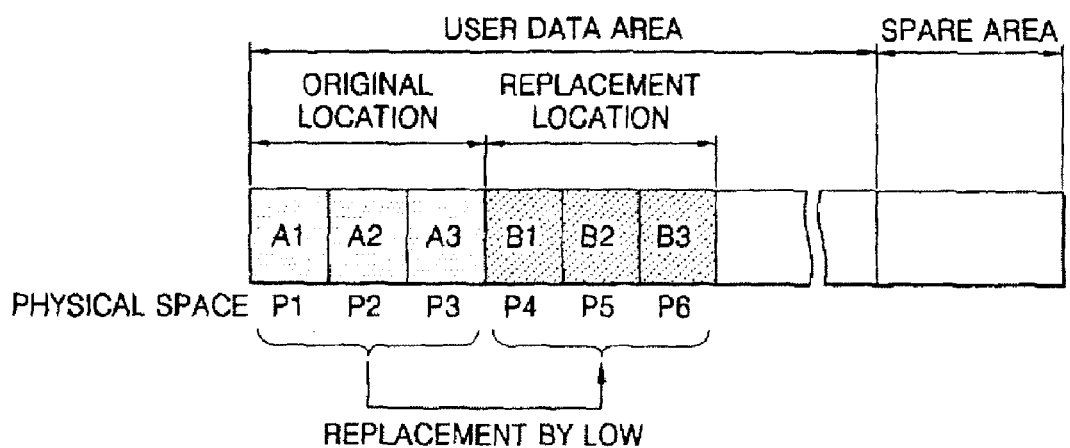
FIG. 1A is a diagram illustrating LOW replacement according to the prior art.
Figure 1B:
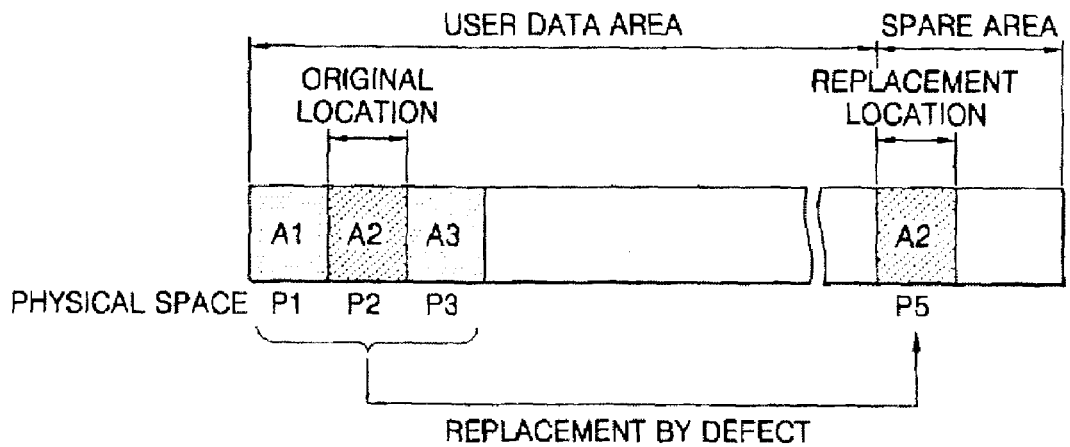
FIG. 1B is a diagram illustrating defect replacement according to the prior art.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

Figure 2:
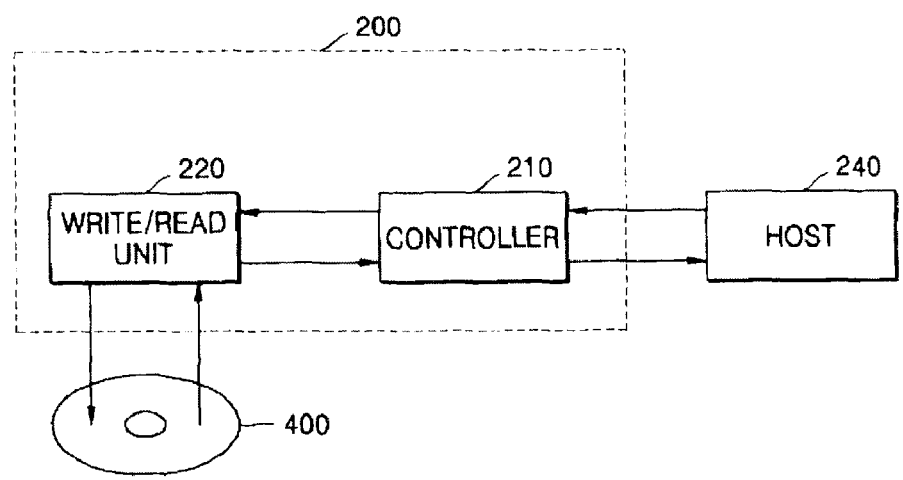
FIG. 2 is a block diagram of a recording/reproducing apparatus according to an embodiment of the present invention.

FIG. 2 is a schematic block diagram of a recording/reproducing apparatus 200 according to an embodiment of the present invention. Referring to FIG. 2, the recording/reproducing apparatus 200 includes a write/read unit 220 and a controller 210. The controller 210 controls the write/read unit 220 to record data on a disk 400, which is an information storage medium according to an embodiment of the present invention, and to read data to reproduce the recorded data. The controller 210 controls the write/read unit 220 to record data by a predetermined write unit block or obtains valid data by processing data read by the write/read unit 220. A logical overwrite (LOW) is implemented in the disk 400 in which an area for replacement by LOW is discriminated from an area for replacement by defect.

In a recording operation, the controller 210 controls the write/read unit 220 to record data by performing the LOW in response to a command of a host 240 or a control of a drive system. In the LOW, updated data, i.e., replacement data, is recorded in a unrecorded area of the user data area of the write once recording medium, and address information of the original data and the replacement data is managed so that a logical address of the replacement data is the same as the logical address of the original data such that the host 240 refers to the same logical address to access the replacement data. A correspondence between the addresses is performed by storing the address information in a DFL entry and writing the DFL entry on the disk 400. The controller 210 performs a read-modify-write (RMW) process when the LOW is performed for partial data of a block, and if a defect occurs in an original block to be replaced during the RMW process, the controller 210 controls the write/read unit 220 to record a replacement block with which the original block is replaced in a unrecorded area of the area for replacement by LOW.

Figure 3:
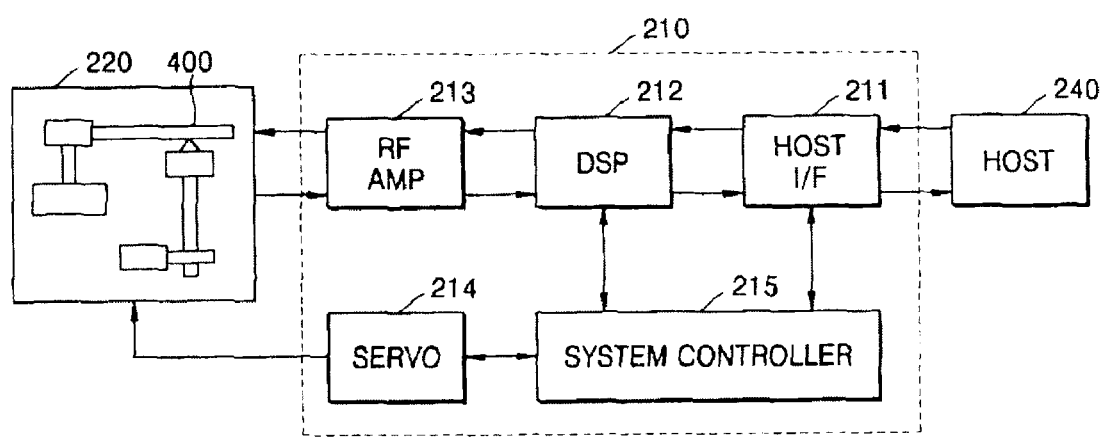
FIG. 3 is a detailed block diagram of the recording/reproducing apparatus shown in FIG. 2.

FIG. 3 is a detailed block diagram of the recording/reproducing apparatus 200 shown in FIG. 2 implemented as a disk drive. Referring to FIG. 3, the disk drive includes a pickup unit as the write/read unit 220, which accommodates the disk 400. The disk drive also includes a host interface (I/F) 211, a digital signal processor (DSP) 212, a radio frequency amplifier (RF AMP) 213, a servo 214 and a system controller 215 within the controller 210.

In a recording operation, the host I/F 211 receives a write command including data for updating partial sectors of a block previously recorded on the disk 400 and logical address information of the data to be updated from the host 240 and transmits them to the system controller 215.

The system controller 215 receives the write command from the host I/F 211 and performs initialization required for recording.

The system controller 215 performs an RMW process to logically overwrite the partial sectors of the previously recorded block. If it is determined that the previously recorded block is a defect block since the previously recorded block cannot be reproduced due to causes such as an ECC error occurring during a reading process of the RMW process, the system controller 215 controls the write/read unit 220 to record a replacement block for replacing the defect block detected during the RMW-by-LOW process in an area for replacement by LOW. Here, the system controller stores in the replacement block location information of a previous block immediately before the replacement and additional information including state information indicating that the remaining sectors in the replacement block except the updated partial sectors have invalid data. In addition, the system controller 210 generates a DFL entry for indicating the replacement state indicating that the original block is replaced with the replacement block.

For example, when partial sectors of an original block A in a user data area are logically overwritten, even if the original block A is determined to be a defect block and cannot be reproduced, a replacement block B replacing the original block A is recorded in a unrecorded area of the user data area, and location information of the original block A and state information indicating that the remaining sectors of the replacement block B, except the partial sectors, have invalid data are included in additional information of the replacement block B. Here, the state information indicates whether data is valid sector by sector.

As described above, even if an original block to be updated cannot be reproduced in a read process of an RMW-by-LOW process, a replacement block replacing the original block (i.e., a defect block since a defect has occurred) is recorded in the area for replacement by LOW since the defect block is detected in the RMW process, which cannot be performed unless the LOW is implemented in a write-once recording medium and apparatus. In other words, even if no defect is detected from the original block, since the replacement block replacing the original block is recorded in a unrecorded area of the area for replacement by LOW, the replacement block replacing the original block may be recorded in the unrecorded area of the area for LOW replacement.

When a final replacement block B in the user data is reproduced in the future, it is determined whether data of the final replacement block B is valid by referring to the state information of the additional information, and if the data is valid, the final replacement block B is reproduced and transmitted to the host 240. If the final replacement block B cannot be reproduced due to a defect, since it is a replacement block in the area for replacement by LOW, data in the final replacement block B is different from data in the original block. Accordingly, reproduction of the final replacement block B is retried, or an error message is transmitted to the host 240. When a DFL entry (replacement entry) is recovered in the future, the recovery is performed by tracing location information of a previous replacement block stored in the additional information. By tracing the location information, the area for replacement by LOW and the area for replacement by defect can be maintained, thereby maintaining efficiency of media usage as it is.

The DSP 212 adds additional data such as parity bits for error correction to the data to be written that is received from the host I/F 211, generates an ECC block, which is an error correction block, by performing ECC encoding on the data, and modulates the generated ECC block in a predetermined manner. The RF AMP 213 converts the data output from the DSP 212 to an RF signal. The pickup unit writes the RF signal output from the RF AMP 213 on the disk 400. The servo 214 receives a command required for a servo control from the system controller 215 and servo-controls the pickup unit.

In a reproducing operation, the host I/F 211 receives a reproduction command from the host 240. The system controller 215 performs initialization required for the reproduction.

When the system controller 215 intends to reproduce padding data of the replacement block B in the state described above, the system controller 215 recognizes from the additional information that the padding data is invalid data and tries to reproduce the previous replacement block with reference to the location information of the previous replacement block. Since the previous replacement block is a defect block, even if the system controller 215 tries to reproduce the previous replacement block, the previous replacement block may not be correctly reproduced. However, the previous replacement block may be sometimes reproduced by cleaning dust from the surface of the disk 400, and then valid data can be obtained.

The pickup unit radiates a laser beam on the disk 400 and outputs an optical signal obtained by receiving the laser beam reflected from the disk 400. The RF AMP 213 converts the optical signal output from the pickup unit to an RF signal, provides modulated data obtained from the RF signal to the DSP 212, and provides a servo signal for control obtained from the RF signal to the servo 214. The DSP 212 demodulates the modulated data and outputs data obtained through ECC error correction.

The servo 214 performs the servo control of the pickup unit based on the servo signal received from the RF AMP 213 and the command required for the servo control received from the system controller 215. The host I/F 211 transmits the data received from the DSP 212 to the host 240.

Figure 4:
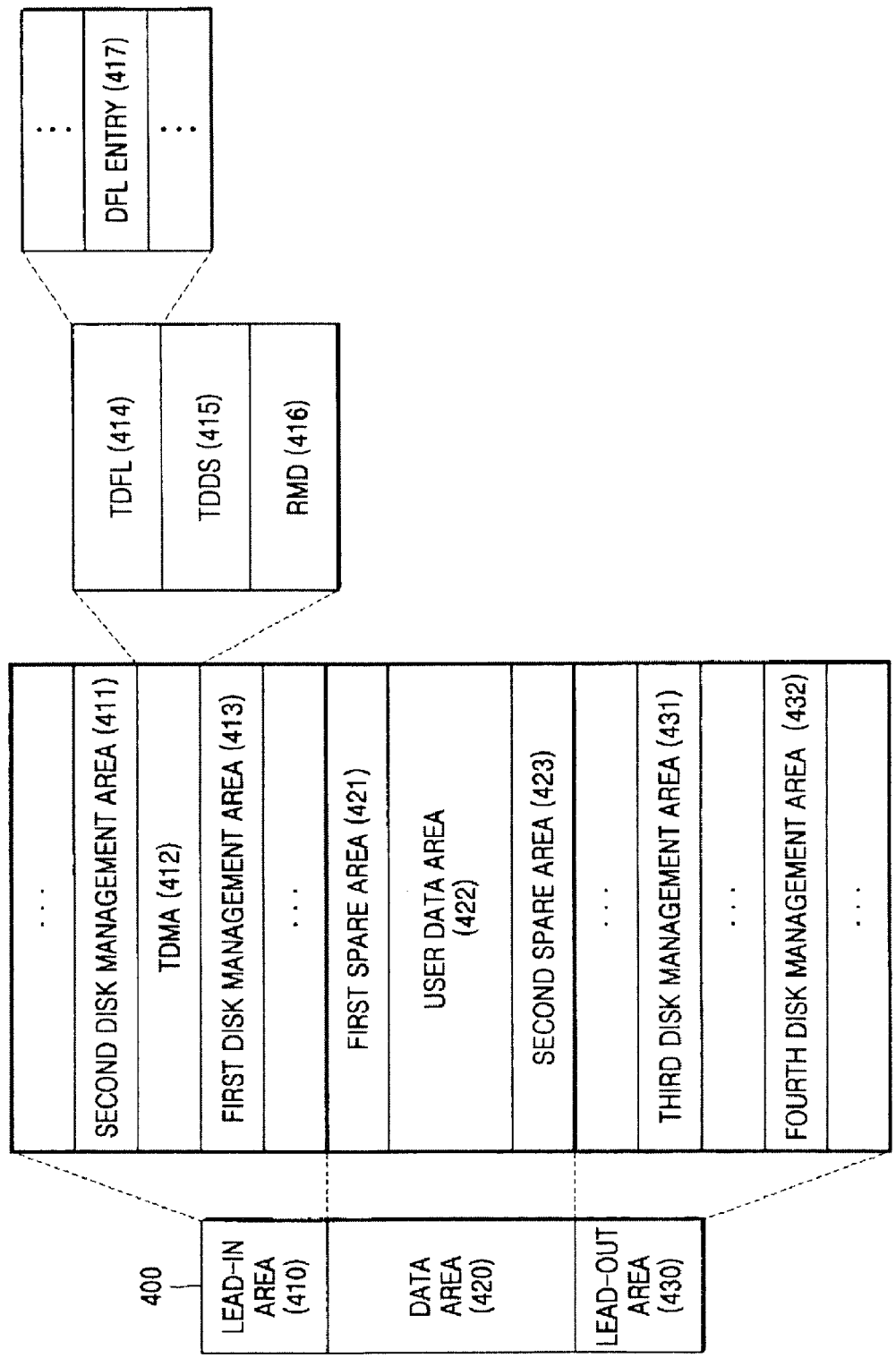
FIG. 4 is a structural diagram of an information storage medium according to an embodiment of the present invention.

FIG. 4 is a structural diagram of an information storage medium 400 according to an embodiment of the present invention. Referring to FIG. 4, a structure of data written on the write-once information storage medium 400 includes a lead-in area 410, a data area 420 and a lead-out area 430. The lead-in area 410 includes a second disk management area 411, a temporary disk management area (TDMA) 412, and a first disk management area 413.

The TDMA 412 is an area to write information on temporary defect management and temporary disk management for managing the write-once information storage medium 400. The TDMA 412 includes a temporary defect list (TDFL) 414, a temporary disk definition structure (TDDS) 415 and recording management data (RMD) 416.

The TDFL 414 indicates information on temporary defects and includes location information of defect data and location information of replacement data for replacing the defect data. In particular, the TDFL 414 includes a replacement entry 417 for indicating a state of the replacement by defect or a state of the replacement by LOW.

The TDDS 415 includes location pointers of the TDFL 414 and a drive area, location and size information of spare areas 421 and 423 assigned in an initializing operation, write protection information, location and size information of a temporary defect management area assigned in the data area 420, information on the user data area 422, information on a replaceable location in each spare area, and last recorded address information of the user data area 422.

The RMD 416 is information indicating whether the user data area 422 has been recorded using a bit value for each block. The first disk management area 413, the second disk management area 411, a third disk management area 431 and a fourth disk management area 432 are areas to store final disk management information when the write-once information storage medium 400 is finalized.

The data area 420 sequentially includes the first spare area 421, the user data area 422, and the second spare area 423. The first and second spare areas 421 and 423 are areas to record therein replacement data for replacing data recorded in the user data area 422. Replacement data due to defects is recorded in the spare areas 421 and 423.

The user data area 422 is an area for recording therein user data. In particular, replacement data for replacing user data by LOW is recorded in the user data area 422. The user data area 422 is divided into one or a plurality of small areas in which addition of user data and the LOW are possible, and since the replacement by LOW is limited to the user data area 422, an area for the replacement by defect is discriminated from an area for the replacement by LOW. In other words, if a replacement block exists in the user data area 422, it is a replacement block by LOW, and if a replacement block exists in the spare area 421 or 423, it is a replacement block by defect.

Figure 5:
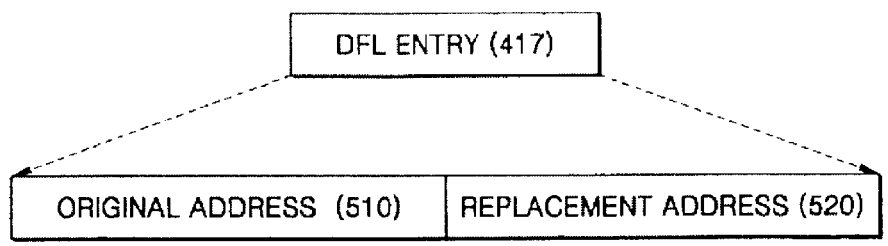
FIG. 5 is a structural diagram of a DFL entry illustrated in FIG. 4.

FIG. 5 is a structural diagram of the DFL entry 417 illustrated in FIG. 4. Referring to FIG. 5, the DFL entry 417 includes an original address 510 and a replacement address 520.

The original address 510 indicates an address in a physical space of an original recording block, and the replacement address 520 indicates an address in a physical space of a replacement recording block. That is, the original address 510 may be a physical address corresponding to a logical address directed in a recording command of a host, and the replacement address 520 may be a physical address of a finally replaced replacement block. If a first replacement block is generated by replacing an original block in replacement by LOW once, the physical address of the finally replaced replacement block is a physical address of the first replacement block. If a plurality of replacement blocks are generated by performing the replacement by LOW for the original block a plurality of times, the physical address of the finally replaced replacement block is a physical address of a replacement block.

Figure 6:
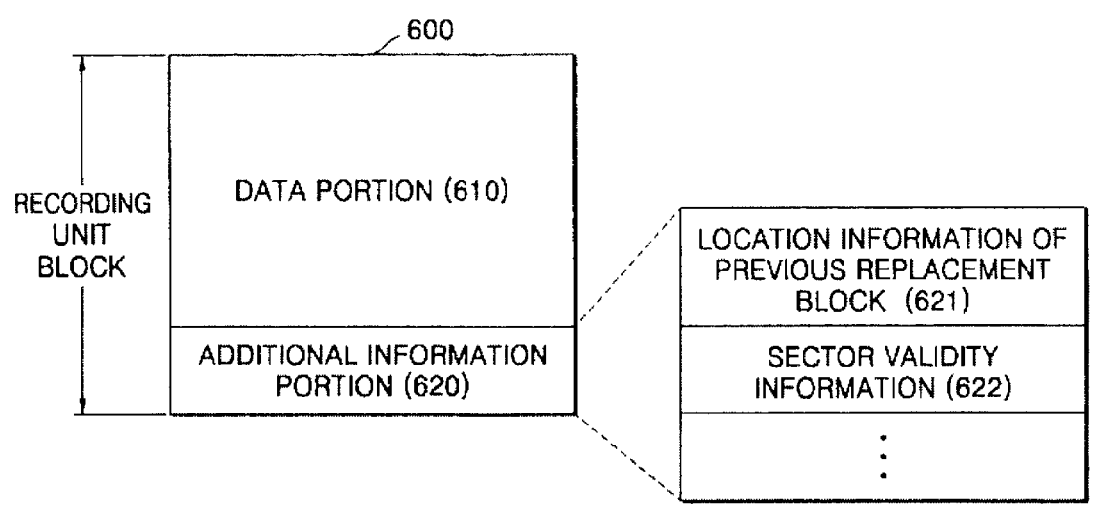
FIG. 6 is a structural diagram of a recording unit block according to an embodiment of the present invention.

FIG. 6 is a structural diagram of a recording unit block 600 according to an embodiment of the present invention. Referring to FIG. 6, the recording unit block 600 includes a data portion 610 and an additional information portion 620.

The data portion 610 is a portion containing user data. In a case where an original block is logically overwritten using an RMW process, if the original block is correctly reproduced without a defect, the data portion 610 is full with valid data, and if the original block cannot be reproduced due to a defect, the data portion 610 has partially overwritten data and padding data. Here, the partially overwritten data indicates valid data, and the padding data indicates invalid data.

The additional information portion 620 is a portion containing additional information of the user data. The additional information portion 620 may include location information of a previous replacement block 621 and validity information 622 of sectors in the user data included in the data portion 610.

When replacement is performed once, the location information of a previous replacement block 621 indicates location information of the original block, and when the replacement is performed twice, the location information of a previous replacement block 621 indicates location information of another previous replacement block which replaced the original block. Thus, each replacement block refers to another replacement block or to the original block so that each replacement block is traceable back to the original block.

The validity information 622 indicates whether data is valid sector by sector, and if data contained in the data portion 610 is all valid, the validity information 622 has state information indicating that all data sectors are valid, and if the data contained in the data portion 610 is partially valid, the validity information 622 has state information indicating that partial data is valid and the remaining data is invalid.

Here, the additional information portion 620 may have an error correction structure different from an error correction structure of the data portion 610, and the recording unit block 600 may be recorded so that error correction capability of the additional information portion 620 is better than error correction capability of the data portion 610.

That is, since the recording/reproducing block 600 is separately includes an error correction block for user data in the data portion 610 and an error correction block for additional information in the additional information portion 620, the error correction block for additional information may be error-correctable even if the error correction block for user data cannot be error-corrected. For example, like the LDC (long distance code) cluster for user data and the BIS (burst indicating subcode) cluster for additional information according to the Blu-ray ECC format, the error correction capability of the BIS cluster should be very good.

Figure 7:
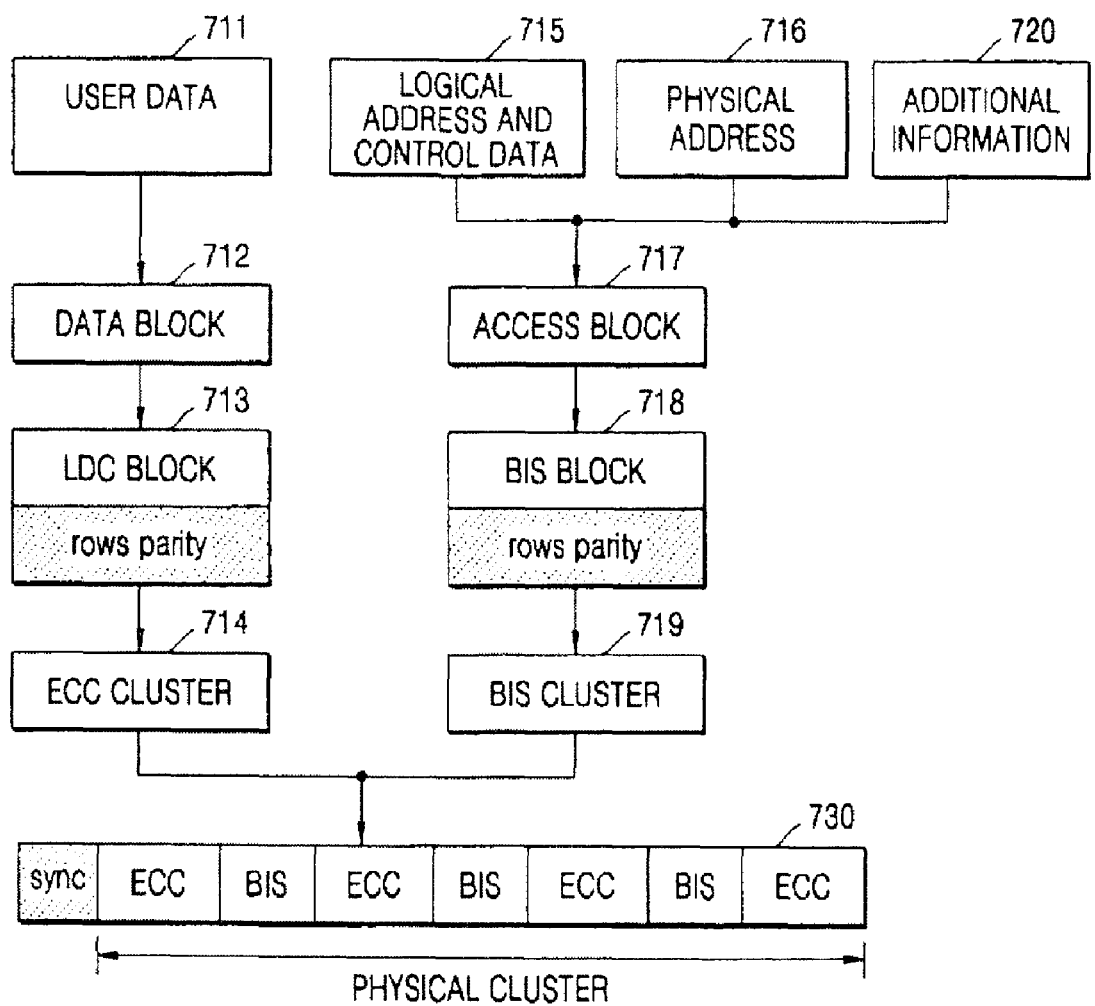
FIG. 7 is a detailed example of the recording unit block illustrated in FIG. 6.

FIG. 7 is a detailed example of the recording unit block 600 illustrated in FIG. 6, an example encoded using an interleaving encoding method. In the interleaving encoding method, a block including user data, called an LDC block, and a block including address data, called a BIS block, are deployed interleavingly and recorded. In a reproducing operation, the block including address data is error-corrected and then the block including user data is error-corrected.

Referring to FIG. 7, user data 711 is divided into a plurality of data frames. The user data 711 forms a data block 712, and an LDC block 713 is formed by adding a predetermined number of row parities to the data block 712. The LDC block 713 includes an ECC cluster 714 according to a predetermined arrangement. The ECC cluster 714 is distributed in ECC portions of a physical cluster block 730.

An access block 717 is formed by combining a logical address and control data 715 combined by a recording system, a physical address 716 related to a physical location on a medium, and additional information 720 according to the present embodiment. A BIS block 718 is formed by adding a predetermined number of row parities to the access block 717. The BIS block 718 includes a BIS cluster 719 according to a predetermined arrangement. The BIS cluster 719 is distributed in BIS columns of the physical cluster block 730. A physical cluster is formed by adding a synchronization bit group of one column to the physical cluster block 730. As described above, error correction capability is improved by arranging data according to the interleaving encoding method, and in particular, the error correction capability of the additional information portion 620 may be improved more than that of the data portion 610.

A block processing method in an RMW process for the LOW for updating at least partial data of an original block according to an embodiment of the present invention will now be described in detail with reference to FIGS. 8A through 10B.

Figure 8A:
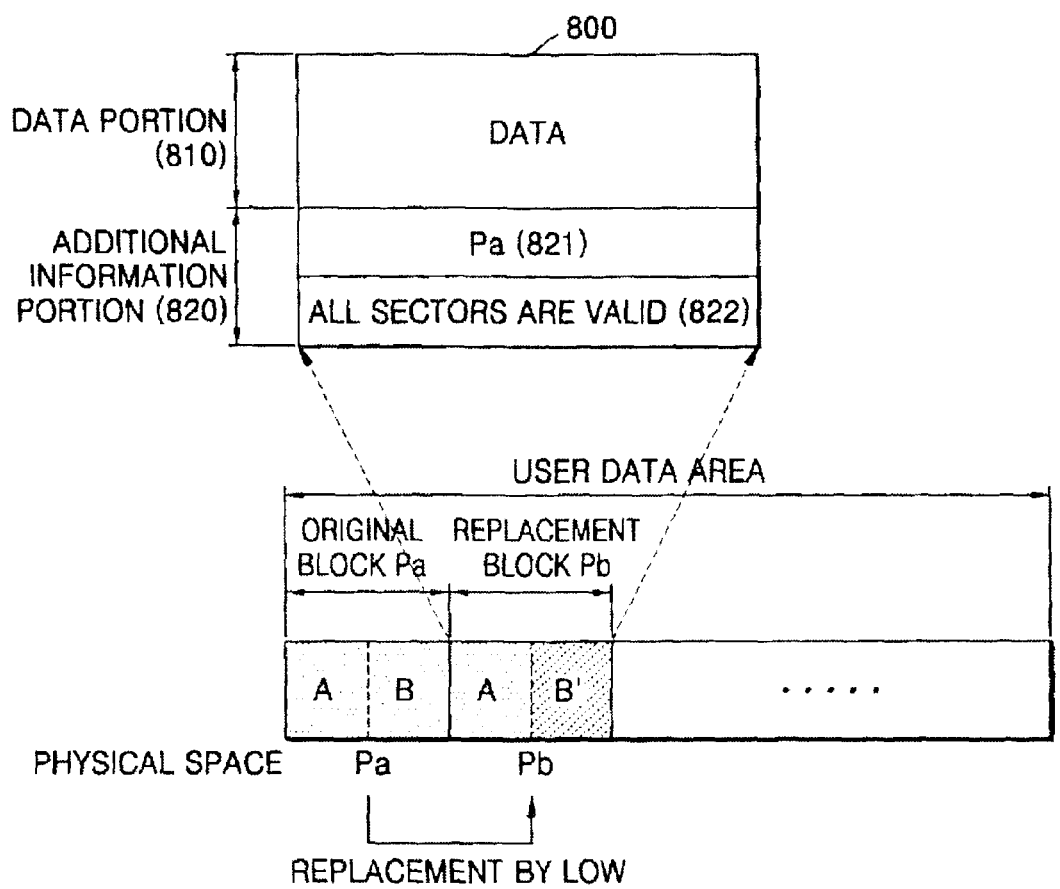
FIG. 8A is a diagram illustrating a block processing method in a case where reproduction of an original block is successful in an RMW process for a LOW according to an embodiment of the present invention.

FIG. 8A illustrates a block processing method in a case where reproduction of an original block is successful in an RMW process for a LOW for updating at least partial data of the original block according to an embodiment of the present invention.

Referring to FIG. 8A, when the RMW process by the LOW is performed to update data B stored in partial sectors of an original block Pa to data B', the original block Pa is successfully replaced with a replacement block Pb 800 by successfully reproducing the original block Pa.

In detail, if a host commands a drive system to record the updated data B' at a recording location of the data B, the drive system reads the original block Pa, modifies sectors corresponding to the data B', and writes the replacement block Pb 800 in a unrecorded area of an area for replacement by LOW.

The replacement block Pb 800 includes a data portion 810 and an additional information portion 820, and the additional information portion 820 includes location information 821 of the original block Pa and state information 822 indicating that all sectors of the replacement block Pb 800 are valid since no error is generated in the RMW process.

Figure 8B:
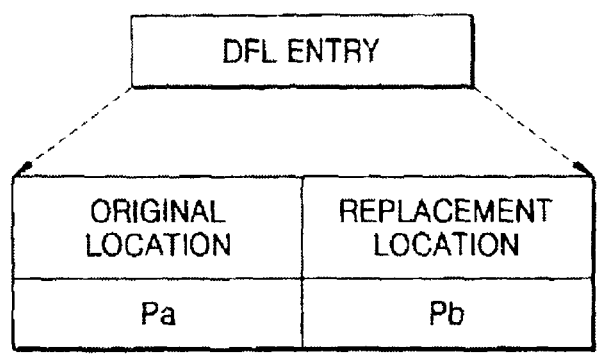
FIG. 8B is a diagram of a DFL entry according to the method illustrated in FIG. 8A.

To indicate this replacement state, defect information is updated by generating a DFL entry indicating that a block stored at an original location Pa is replaced with a block stored at a replacement location Pb as shown in FIG. 8B.

Figure 9A:
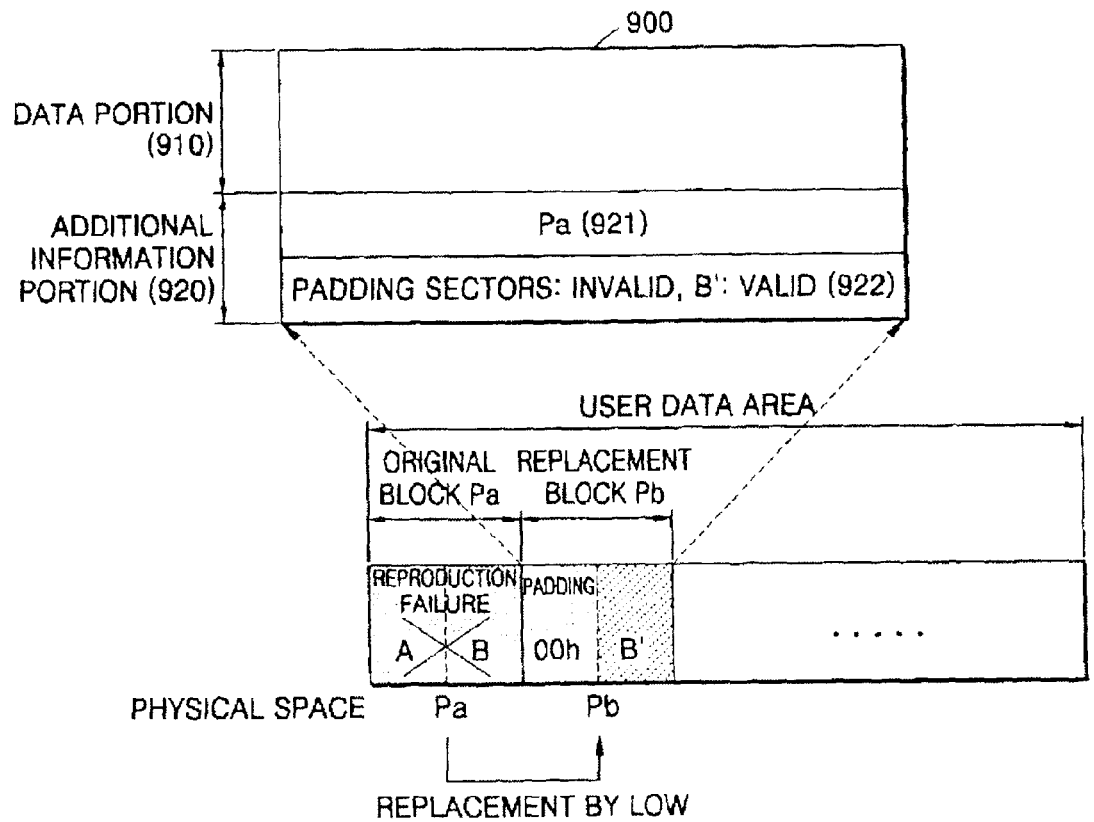
FIG. 9A is a diagram illustrating a block processing method in a case where reproduction of an original block fails in an RMW process for a LOW according to an embodiment of the present invention.

FIG. 9A illustrates a block processing method in a case where reproduction of an original block fails in an RMW process for a LOW for updating at least partial data of the original block according to an embodiment of the present invention.

Referring to FIG. 9A, when the RMW process by the LOW is performed to update data B stored in partial sectors of an original block Pa to data B' and reproduction of the original block Pa fails, a replacement block Pb 900 replacing the original block Pa is recorded in an area for replacement by LOW.

In detail, if a host commands a drive system to record the updated data B' at a recording location of the data B, the drive system reads the original block Pa, modifies sectors corresponding to the data B', and writes the replacement block Pb 900 in a unrecorded area of the area for replacement by LOW. However, where the reproduction of the original block Pa fails, the replacement block Pb 900 is written by recording only the updated data B' in sectors of the replacement block Pb and writing a padding value such as "00h" in the remaining sectors of the replacement block Pb.

The replacement block Pb 900 includes a data portion 910 and additional information portion 920, and the additional information portion 920 includes location information 921 of a block before the replacement, i.e., the original block Pa, and state information 922 indicating that the sectors corresponding to the data B' are valid and the sectors corresponding to the padded portion are invalid since an error is generated in the RMW process.

Figure 9B:
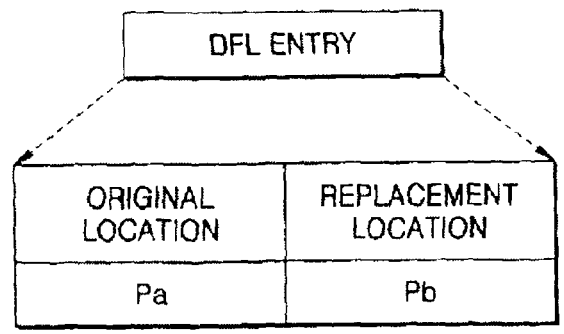
FIG. 9B is a diagram of a DFL entry according to the method illustrated in FIG. 9A.

To indicate this replacement state, defect information is updated by generating a DFL entry indicating that a block stored at an original location Pa is replaced with a block stored at a replacement location Pb as shown in FIG. 9B.

Figure 10A:
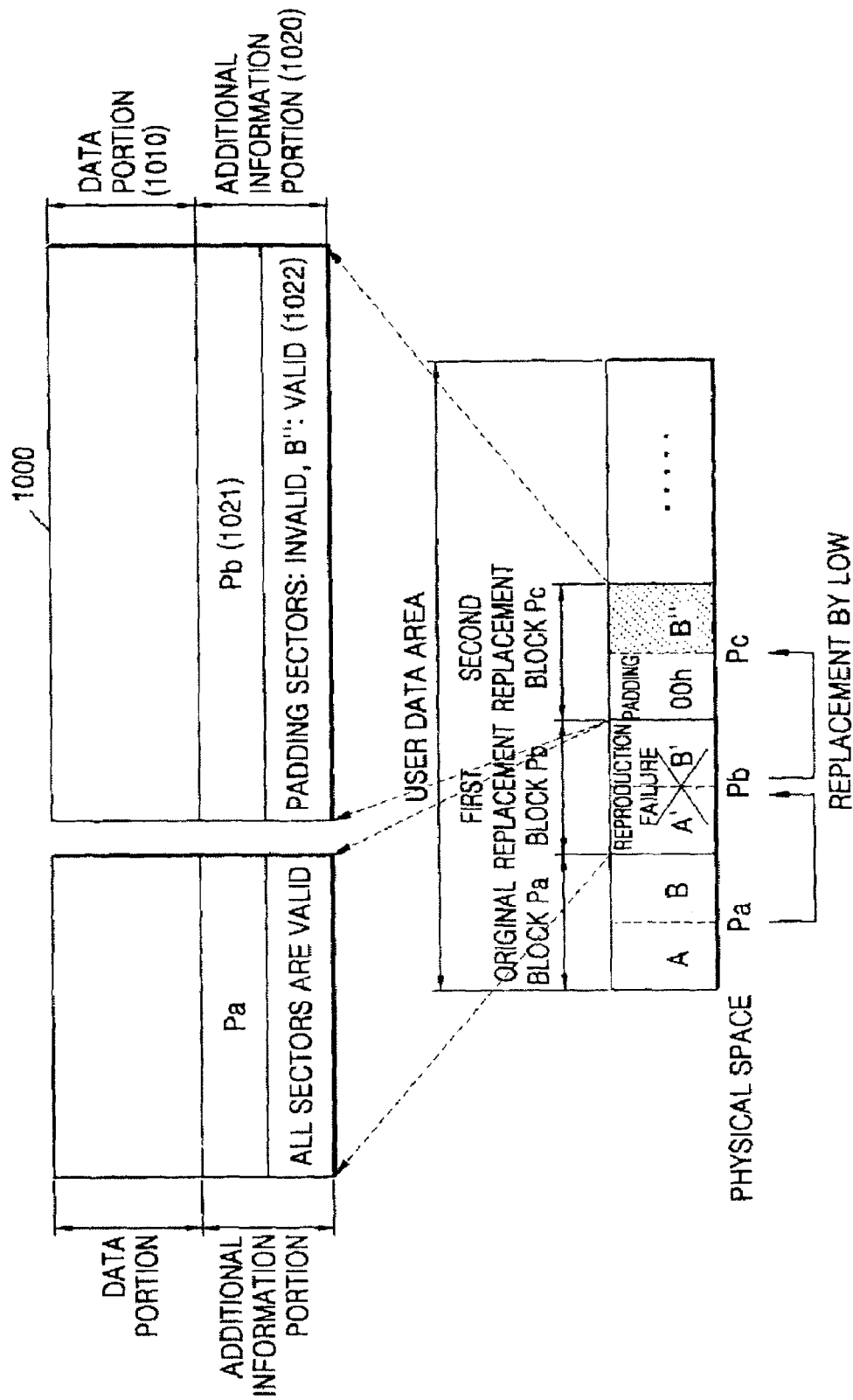
FIG. 10A is a diagram illustrating a block processing method in a case where reproduction of a replacement block fails in an RMW process for a LOW according to an embodiment of the present invention.

FIG. 10A illustrates a block processing method in a case where reproduction of a first replacement block fails in an RMW process for a LOW according to an embodiment of the present invention.

Referring to FIG. 10A, an original block Pa is replaced with a first replacement block Pb by the LOW by updating data A and B stored in the original block Pa to data A' and B' stored in the first replacement block Pb, and an additional information portion of the first replacement block Pb has location information of the original block Pa and state information indicating that all sectors are valid.

Here, the data B' is recorded in a logical space corresponding to a physical space in which the data B is stored. Thereafter, a host commands a drive system to record data B" in the logical space to update the data B' to the data B", the drive system calculates a location of a physical space corresponding to the logical space. The location of the physical space will correspond to partial sectors of the original block Pa.

The drive system recognizes from a defect list that the original block Pa has been replaced with a first replacement block Pb and first reads the first replacement block Pb to perform the RMW process. If reproduction of the first replacement block Pb fails, the drive system records a second replacement block Pc 1000 in a unrecorded area of the area for replacement by LOW. Here, due to the reproduction failure of the first replacement block Pb, the data A' cannot be recorded as it is and is padded with a value such as "00h," and the data B' is updated to the data B".

The second replacement block Pc 1000 includes a data portion 1010 and an additional information portion 1020, and the additional information portion 1020 includes location information 1021 of a block before the replacement, i.e., the first replacement block Pb, and state information 1022 indicating that the sectors corresponding to the data B" are valid and the sectors corresponding to the padded portion are invalid since an error is generated in the RMW process.

Figure 10B:
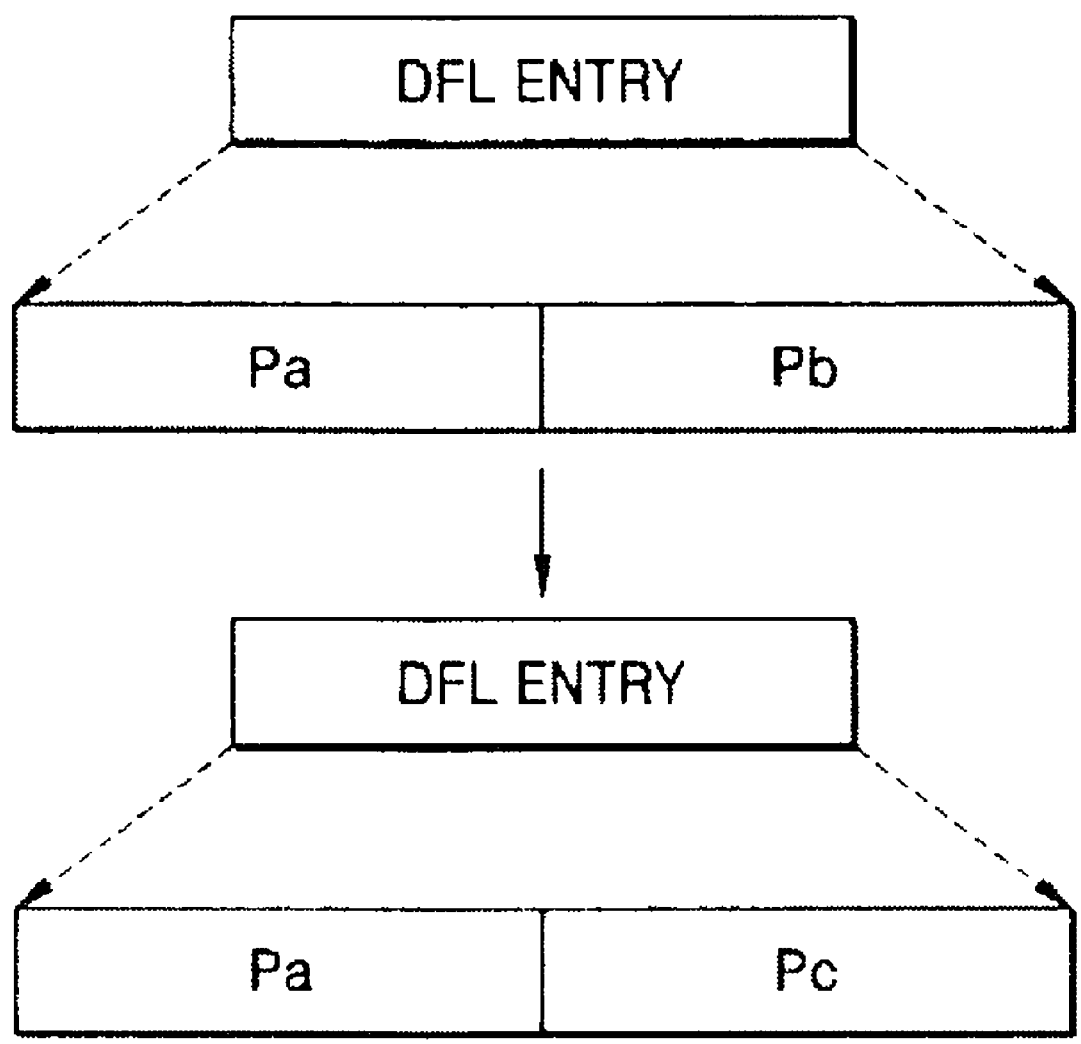
FIG. 10B is a diagram of a DFL entry according to the method illustrated in FIG. 10A.

To indicate this replacement state, defect information is updated by modifying a DFL entry before the update of the data B" to a DFL entry indicating that a block stored at an original location Pa is replaced with a block stored at a second replacement location Pc as shown in FIG. 10B.

Figure 11:
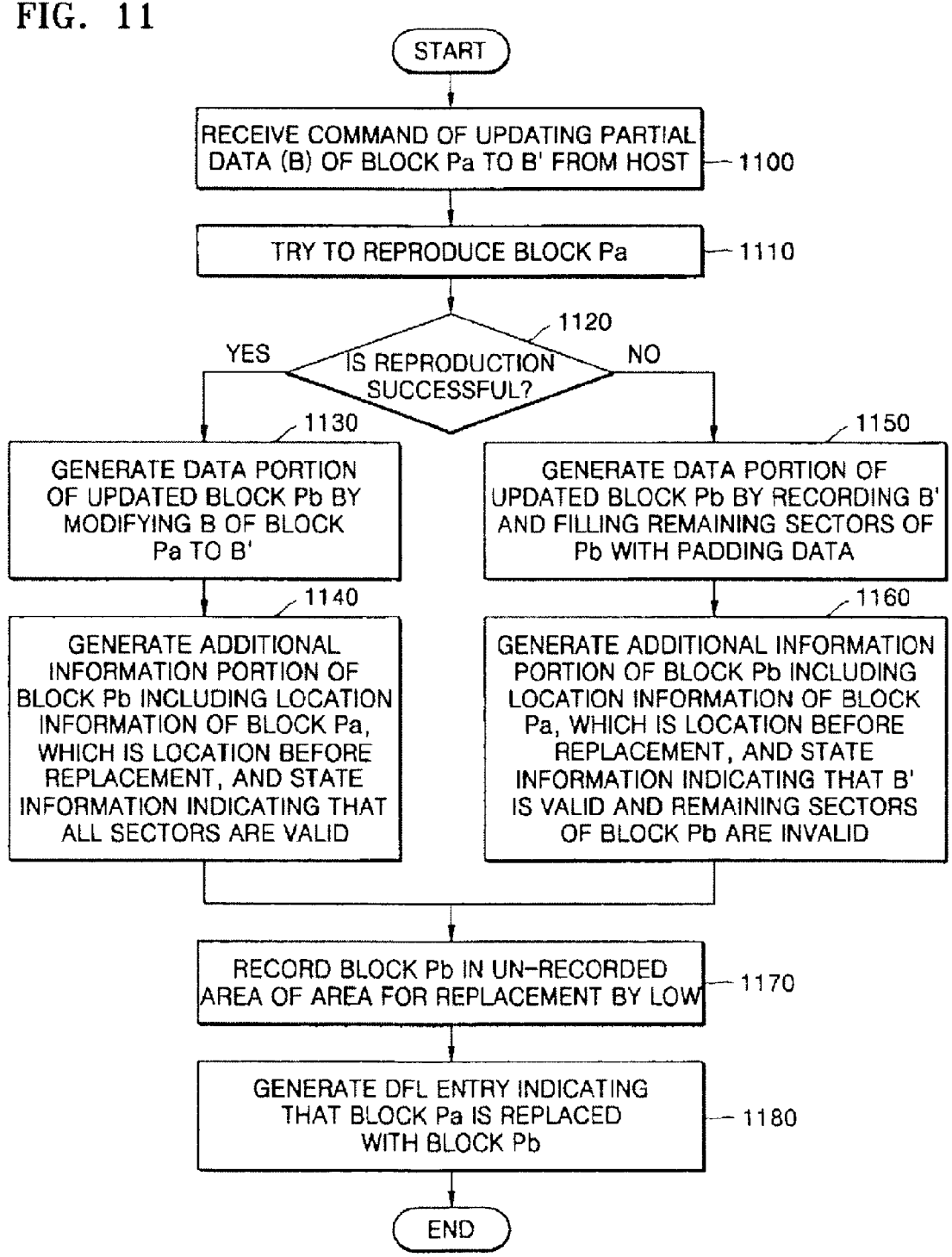
FIG. 11 is a flowchart illustrating a block processing method in a case where a drive system tries a LOW using an RMW process according to an embodiment of the present invention.

FIG. 11 illustrates a block processing method in a case where a drive system tries a LOW using an RMW process according to an embodiment of the present invention. Referring to FIG. 11, the drive system receives a command of updating partial data B of a block Pa recorded in a write-once recording medium to data B' from a host in operation 1100. The write-once recording medium includes an area for replacement by LOW and an area for replacement by defect.

The drive system tries to reproduce the block Pa recorded in the medium to perform the LOW with respect to the block Pa using the RMW process in operation 1110.

The drive system determines whether the reproduction of the block Pa is successful in operation 1120, and if the reproduction of the block Pa is successful, i.e., if no defect is detected from the block Pa, the drive system generates a data portion of an updated block Pb by modifying data B of the block Pa to data B' in operation 1130.

The drive system generates an additional information portion of the block Pb including location information of the block Pa, which is a location before the replacement, and state information indicating that all sectors are valid in operation 1140.

The drive system records the block Pb including the data portion and additional information portion in a unrecorded area of a user data area, which is the area for replacement by LOW in operation 1170.

The drive system generates a DFL entry indicating that the block Pa is replaced with the block Pb in operation 1180.

If the reproduction of the block Pa fails in operation 1120, i.e., if a defect is detected from the block Pa, the drive system generates a data portion of an updated block Pb by recording data B' in the updated block Pb and filling the remaining sectors of block Pb with meaningless padding data in operation 1150.

The drive system generates an additional information portion of the block Pb including location information of the block Pa, which is a location before the replacement, and state information indicating that the data B' is valid and the remaining sectors of the block Pb are invalid in operation 1160.

The drive system records the block Pb in a unrecorded area of a user data area, which is the area for replacement by LOW, in operation 1170, and generates a DFL entry indicating that the block Pa is replaced with the block Pb in operation 1180.

The embodiments of the present invention may be implemented as computer programs stored on a computer readable recording medium and implemented in general-use digital computers that execute the programs. Examples of the computer readable recording medium include magnetic storage media (e.g., ROM, floppy disks, hard disks, etc.), optical recording media (e.g., CD-ROMs, DVDs, etc.), and storage media such as carrier waves (e.g., transmission through the internet). The computer readable recording medium can also be distributed over network coupled computer systems so that the computer readable code is stored and executed in a distributed fashion. The functional programs, codes and code segments for embodying the present invention may be readily deducted by programmers skilled in the art to which the present invention pertains in view of the embodiments disclosed herein.

As described above, according to embodiments of the present invention, in a system in which an area for replacement by defect and an area for replacement by LOW are discriminated from each other, an RMW process for a LOW can be effectively managed by recording a replacement block replacing a defect block in the area for replacement by LOW though a defect is generated during the RMW process for the LOW for updating partial data of a previously recorded block, thereby improving data reproducing efficiency.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:
1. A recording/reproducing method comprising:
    recording logical overwrite (LOW) replacement data configured to update data recorded on an information storage medium in an area for replacement by logical overwrite (LOW);

recording defect replacement data configured to replace a defect occurring on the medium in an area for replacement by defect;

if a defect occurs in a first block recorded in a predetermined area of the medium during a read-modify-write (RMW) process for a replacement by LOW for at least partial data of the first block, recording a second block replacing the first block in the area for replacement by LOW; and generating a defect list (DFL) entry including location information of the first block and location information of the second block, wherein the second block includes a data portion including user data and an additional information portion including the location information of the first block, and wherein the first block is an original block or a previously recorded replacement block.

2. The method of claim 1, wherein the data portion includes a valid data portion, and an invalid data portion in which padding data is recorded.

3. The method of claim 2, wherein the additional information portion further includes state information configured to indicate that the valid data portion and the invalid data portion are included in the data portion.

4. The method of claim 3, wherein the state information is configured to indicate whether data is valid sector by sector.

5. The method of claim 1, wherein the recording of the second block comprises processing the additional information portion to be recorded to have better error correction capability than the user data portion.

6. The method of claim 1, wherein the location information of the first block and the location information of the second block are represented by addresses on a physical space of the medium.

7. A recording/reproducing apparatus, comprising:
a pickup configured to emit or receive a light to transfer data with respect to an information storage medium or read data from the medium; and
a controller configured to control the pickup to:
record logical overwrite (LOW) replacement data configured to update data recorded on the medium in an area for replacement by logical overwrite (LOW),
record defect replacement data configured to replace a defect occurring on the medium in an area for replacement by defect, and
if a defect occurs in a first block recorded in a predetermined area of the medium during a read-modify-write (RMW) process for a replacement by LOW for at least partial data of the first block, record a second block replacing the first block in the area for replacement by LOW,
wherein the controller is configured to generate a defect list (DFL) entry comprising location information of the first block and location information of the second block in order to indicate a replacement state of the data,
wherein the second block comprises a data portion comprising user data and an additional information portion comprising the location information of the first block, and
wherein the first block is an original block or a previously recorded replacement block.

8. The apparatus of claim 7, wherein, where the second block includes only data for updating the partial data of the first block, the controller is configured to store additional information indicating that sectors in the second block, other than sectors having the partial data, have invalid data.

9. The apparatus of claim 7, wherein the controller is configured to generate a DFL entry indicating that the first block is replaced with the second block.

10. The apparatus of claim 8, wherein, where the updated data is subsequently reproduced, the controller is configured to refer to the additional information to reproduce the updated data.

11. The apparatus of claim 8, wherein:
the additional information further comprises state information indicating whether data in the second block is valid, sector by sector.

12. The apparatus of claim 7, wherein, when reproduction of the first block is successful during the read-modify-write (RMW) process for a replacement by LOW, the controller is configured to modify data recorded in the first block with update data and write the modified data to the second block.

13. The apparatus of claim 7, wherein, when reproduction of the first block fails during the read-modify-write (RMW) process for a replacement by LOW, the controller is configured to write only replacement data in one or more sectors of the second block and padding data in remaining sectors of the second block.

\* \* \* \* \*